US009201905B1

(12) United States Patent
Kelsey et al.

(10) Patent No.: US 9,201,905 B1
(45) Date of Patent: Dec. 1, 2015

(54) SEMANTICALLY MEDIATED ACCESS TO KNOWLEDGE

(75) Inventors: William David Kelsey, Issaquah, WA (US); Duane Lee Blanchard, Snoqualmie, WA (US)

(73) Assignee: THE BOEING COMPANY, Chicago, IL (US)

( * ) Notice: Subject to any disclaimer, the term of this patent is extended or adjusted under 35 U.S.C. 154(b) by 1017 days.

(21) Appl. No.: 12/687,377

(22) Filed: Jan. 14, 2010

(51) Int. Cl.
G06F 17/30 (2006.01)
G06F 7/06 (2006.01)

(52) U.S. Cl.
CPC ............ *G06F 17/30283* (2013.01); *G06F 7/06* (2013.01)

(58) Field of Classification Search
None
See application file for complete search history.

(56) References Cited

U.S. PATENT DOCUMENTS

| | | | | |
|---|---|---|---|---|
| 4,805,134 A * | 2/1989 | Calo et al. | | 1/1 |
| 5,875,446 A * | 2/1999 | Brown et al. | | 1/1 |
| 5,933,822 A * | 8/1999 | Braden-Harder et al. | | 1/1 |
| 6,748,447 B1 * | 6/2004 | Basani et al. | | 709/244 |
| 7,013,264 B2 * | 3/2006 | Dolan et al. | | 704/9 |
| 7,146,356 B2 * | 12/2006 | Choi et al. | | 707/706 |
| 7,254,589 B2 * | 8/2007 | Goodwin et al. | | 1/1 |
| 7,630,970 B2 * | 12/2009 | Wooldridge et al. | | 1/1 |
| 7,680,855 B2 * | 3/2010 | Hyder et al. | | 707/710 |
| 7,680,867 B2 * | 3/2010 | Green et al. | | 707/811 |
| 7,702,674 B2 * | 4/2010 | Hyder et al. | | 707/710 |
| 7,707,203 B2 * | 4/2010 | Hyder et al. | | 707/710 |
| 7,725,499 B1 * | 5/2010 | von Lepel et al. | | 707/803 |
| 7,779,051 B2 * | 8/2010 | Friedlander et al. | | 707/810 |
| 8,019,945 B2 * | 9/2011 | Revanuru | | 711/118 |
| 2002/0143759 A1 * | 10/2002 | Yu | | 707/5 |
| 2003/0221160 A1 * | 11/2003 | Van Den Tillaart | | 715/500 |
| 2005/0192968 A1 * | 9/2005 | Beretich et al. | | 707/10 |
| 2006/0116994 A1 * | 6/2006 | Jonker et al. | | 707/3 |
| 2006/0229899 A1 * | 10/2006 | Hyder et al. | | 705/1 |
| 2007/0203865 A1 * | 8/2007 | Hirsch | | 706/46 |
| 2008/0088628 A1 * | 4/2008 | Lu et al. | | 345/440 |
| 2008/0306937 A1 * | 12/2008 | Whilte et al. | | 707/5 |
| 2009/0319981 A1 * | 12/2009 | Akkiraju et al. | | 717/104 |
| 2010/0082732 A1 * | 4/2010 | Guenther et al. | | 709/203 |
| 2010/0169304 A1 * | 7/2010 | Hendricksen et al. | | 707/723 |
| 2010/0185489 A1 * | 7/2010 | Satyavolu et al. | | 705/10 |
| 2010/0262615 A1 * | 10/2010 | Oztekin et al. | | 707/768 |
| 2010/0287175 A1 * | 11/2010 | Beaudreau et al. | | 707/759 |
| 2010/0312764 A1 * | 12/2010 | Liao et al. | | 707/723 |
| 2010/0332513 A1 * | 12/2010 | Azar et al. | | 707/769 |

(Continued)

OTHER PUBLICATIONS

Yuan et al., "Tailored and secured Semantic Integration and Interoperability for Existing Information Systems", Proc. MILCOM, Boston MA, 2009, pp. 1-7.

(Continued)

*Primary Examiner* — Neveen Abel Jalil
*Assistant Examiner* — Tyler Torgrimson
(74) *Attorney, Agent, or Firm* — Yee & Associates, P.C.

(57) ABSTRACT

The different advantageous embodiments provide a system for positioning data within a network comprising a knowledge manager, a canonical model manager, and a context manager. The knowledge manager is configured to process a query across a number of resources to generate a result. The canonical model manager includes a number of models used to identify relationships between types of information within the number of resources and the query. The context manager is configured to manage the context of the query and the relationships identified by the canonical model manager to position the number of resources for access by the knowledge manager.

19 Claims, 11 Drawing Sheets

(56) References Cited

U.S. PATENT DOCUMENTS

2011/0125743 A1* 5/2011 Immonen et al. ............ 707/737
2011/0161304 A1* 6/2011 Carr et al. .................... 707/694
2011/0208776 A1* 8/2011 Lee et al. ...................... 707/769
2011/0302149 A1* 12/2011 Vadlamani et al. ........... 707/711
2012/0109841 A1* 5/2012 Moussa et al. ................ 705/332
2012/0124029 A1* 5/2012 Kant ............................. 707/715

OTHER PUBLICATIONS

Yuan, "Semantic-Based Dynamic Enterprise Information Integration", Database Modeling for Industrial Data Management Emerging Technologies and Applications, 2006, Idea Group Inc., pp. 185-216.

* cited by examiner

SEMANTICALLY MEDIATED ACCESS TO KNOWLEDGE

BACKGROUND INFORMATION

1. Field

The present disclosure relates generally to a data processing system and more particularly to a system for knowledge discovery and context management. Still more particularly, the present disclosure relates to a system for discovery and representation of knowledge and semantic relationships from data.

2. Background

Information overload refers to an excess amount of information being provided, which complicates processing and absorbing information. As available information increases, addressing information overload has become a significant challenge. Tools which increase access to information also contribute to information overload. In an information-rich environment, increasing availability to information decreases the amount of attention an information consumer can allocate to individual pieces of information.

Retrieval of specific information stored across disparate data sets and data types can be inefficient. Data is stored in many disparate types of structures, such as relational databases, extensible markup language documents, spreadsheets, electronic messages, really simple syndication (RSS) feeds, and others, for example. Querying across a whole collection of data requires querying each disparate type of resource individually. Additionally, each resource may have its own query language or style. Summarizing the results of these individual searches may take significant time and effort, as well as being cost-prohibitive.

Another aspect of information is the potential to be ambiguous. Terminology is often understood in different ways by different consumers, and may also be understood differently based on context. Data is useful when the information it contains can be discovered or extracted in some efficient and transparent manner. Discovering information from data requires querying across a collection of data and aligning information to a given context as well as capturing its relationship to other information.

Therefore, it is advantageous to have a method and apparatus that takes into account one or more of the issues discussed above, the relationships between data, the ambiguity of meaning, and the growing volume of information, as well as possibly other issues.

SUMMARY

One or more of the different advantageous embodiments provide a system for positioning data within a network comprising a knowledge manager, a canonical model manager, and a context manager. The knowledge manager is configured to process a query across a number of resources to generate a result. The canonical model manager includes a number of models used to identify relationships between types of information within the number of resources and the query. The context manager is configured to manage the context of the query, and the relationships identified by the canonical model manager, to position the number of resources for access by the knowledge manager.

The different advantageous embodiments further provide a method for positioning data within a network. A natural language query is received over a user interface. The natural language query is parsed to identify a number of words and a number of phrases. The natural language query is mapped to a number of domain models using the number of words and the number of phrases. The natural language query is converted into a logical query using the number of domain models mapped to the natural language query. The logical query is processed across a number of resources to generate a result.

The different advantageous embodiments further provide a method for knowledge management. A query is received from a querent. A determination is made as to whether the query is in logical form. In response to a determination that the query is in logical form, entries of the logical form query are compared with canonical models passed from a semantic query engine. A determination is made as to whether the entries of the logical form query match entries of the canonical models. A relational form query is passed to a knowledge manager.

The features, functions, and advantages can be achieved independently in various embodiments of the present disclosure, or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
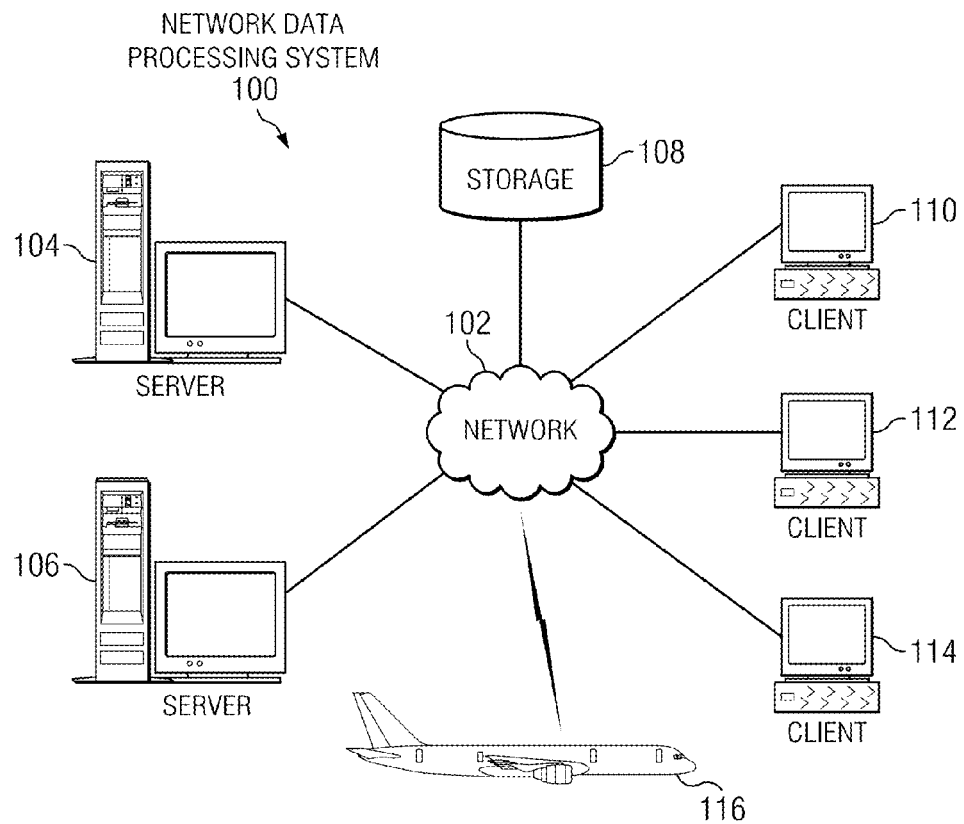
FIG. 1 is an illustration of a network of data processing systems in which the advantageous embodiments may be implemented.
Figure 2:
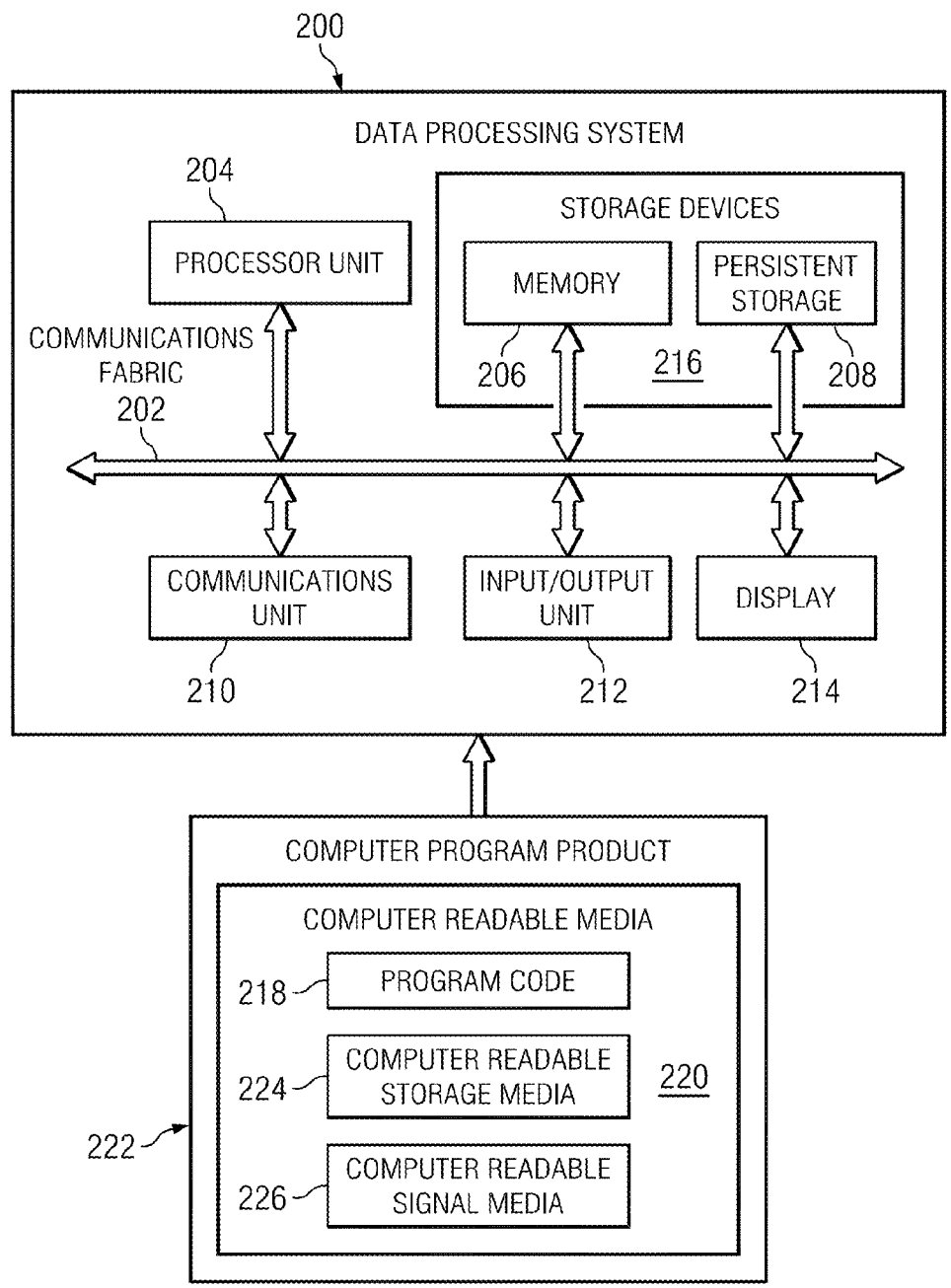
FIG. 2 is an illustration of a data processing system in accordance with an advantageous embodiment.

With reference now to the figures and in particular with reference to FIGS. 1-2, exemplary diagrams of data processing environments are provided in which the advantageous embodiments of the present invention may be implemented. It should be appreciated that FIGS. 1-2 are only exemplary and are not intended to assert or imply any limitations with regard to the environments in which different embodiments may be implemented. Many modifications to the depicted environments may be made.

With reference now to the figures, FIG. 1 depicts a pictorial representation of a network of data processing systems in which the advantageous embodiments of the present invention may be implemented. Network data processing system 100 is a network of computers in which embodiments may be implemented. Network data processing system 100 contains network 102, which is the medium used to provide communications links between various devices and computers, connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Aircraft 116 also is a client that may exchange information with clients 110, 112, and 114. Aircraft 116 also may exchange information with servers 104 and 106. Aircraft 116 may exchange data with different computers through a wireless communications link while in-flight, or any other type of communications link while on the ground. In these examples, server 104, server 106, client 110, client 112, and client 114 may be computers. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. Of course, network data processing system 100 also may be implemented as a number of different types of networks, such as, for example, an intranet, a local area network (LAN), or a wide area network (WAN). FIG. 1 is intended as an example, and not as an architectural limitation for different embodiments.

Turning now to FIG. 2, a diagram of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-core processor, or multiple central processing units (CPUs), depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory, or any other suitable volatile or non-volatile storage device. Persistent storage 208 may take various forms, depending on the particular implementation. For example, persistent storage 208 may contain one or more components or devices. For example, persistent storage 208 may be a hard drive, flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communication with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code, in the different embodiments, may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system, including components in addition to or in place of those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C.

The different advantageous embodiments recognize and take into account a number of different considerations. For example, the different advantageous embodiments recognize and take into account that current systems for retrieving information stored across disparate data sets can be very inefficient. Querying across whole collections of data requires querying each disparate resource individually. Additionally, each resource may have a unique query language or style required to access information. Summarizing the results of these individual searches is costly in terms of time and effort, and the information collected may be ambiguous.

The different advantageous embodiments further recognize and take into account that current methods for summarizing information collected include manual research and compilation by human users. Other methods involve use of expensive tools that are not configured to meet specific user needs, and/or require learning a specialized query language. Individual query results at best provide a result to the asked question, often missing the implied query or context. Additionally, data of various types are best represented in particular formats. For example, geospatial data is most clearly represented on a geographic map, while temporal data is best represented on a timeline. Query results are often made up of more than one type of data, which further increases the amount of information returned.

Thus, one or more of the different advantageous embodiments provides a system for positioning data within a network comprising a knowledge manager, a canonical model manager, and a context manager. The knowledge manager is configured to process a query across a number of resources to generate a result. The canonical model manager includes a number of models used to identify relationships between types of information within the number of resources and the query. The context manager is configured to manage the context of the query, and the relationships identified by the canonical model manager, to position the number of resources for access by the knowledge manager.

The different advantageous embodiments further provide a method for positioning data within a network. A natural language query is received over a user interface. The natural language query is parsed to identify a number of words and a number of phrases. The natural language query is mapped to a number of domain models using the number of words and the number of phrases. The natural language query is converted into a logical query using the number of domain models mapped to the natural language query. The logical query is processed across a number of resources to generate a result.

The different advantageous embodiments further provide a method for knowledge management. A query is received from a querent. A determination is made as to whether the query is in logical form. In response to a determination that the query is in logical form, entries of the logical form query are compared with canonical models passed from a semantic query engine. A determination is made as to whether the entries of the logical form query match entries of the canonical models. A relational form query is passed to a knowledge manager.

Figure 3:
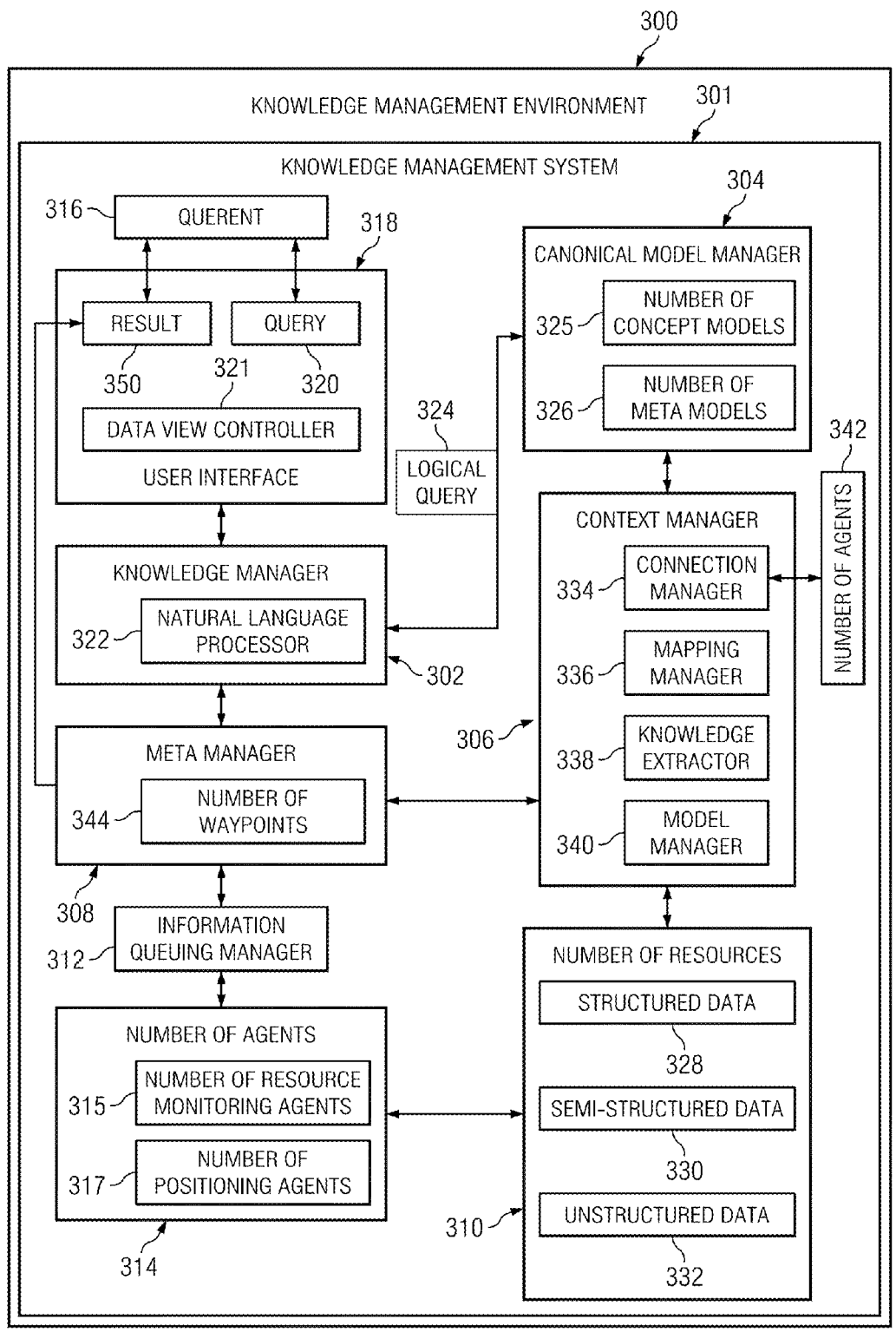
FIG. 3 is an illustration of a knowledge management environment in accordance with an advantageous embodiment.

With reference now to FIG. 3, an illustration of a knowledge management environment is depicted in accordance with an advantageous embodiment. Knowledge management environment 300 may be implemented in a network environment, such as network 102 in FIG. 1, in an illustrative example.

Knowledge management environment 300 includes knowledge management system 301. Knowledge management system 301 includes knowledge manager 302, canonical model manager 304, context manager 306, meta manager 308, number of resources 310, information queuing manager 312, and number of agents 314. Querent 316 accesses knowledge manager 302 via user interface 318. User interface 318 may be, for example, without limitation, a graphical user interface, an application programming interface, and/or any other suitable interface. Querent 316 may be, for example, without limitation, a human, intelligent agents, autonomous agents, web services, and/or any other suitable operator. Querent 316 may input query 320 into knowledge manager 302 via user interface 318. In one illustrative example, query 320 may be any combination of colloquial English questions and/or commands in a natural language format. In another illustrative example, query 320 may be any combination of any colloquial questions and/or commands in any language. In yet another illustrative example, query 320 may be a logical query from intelligent agents or web services.

Knowledge manager 302 receives query 320 and determines the form in which query 320 was inputted. The form may be natural language or logical form, for example. If query 320 is in natural language form, knowledge manager 302 uses natural language processor 322 to convert query 320 into machine language, or logical form, for example. In this example, query 320 is first parsed by natural language processor 322 and the semantics of query 320 are matched to the available semantic entities in number of concept models 325 found in canonical model manager 304 to form logical query 324.

Knowledge manager 302 then processes logical query 324 against number of meta models 326 found in canonical model manager 304 to map entities from query 320 to corresponding meanings and relationships. Entities from a query may include, for example, without limitation, words and phrases of a natural language query, logical entities from a logical query, and/or any other suitable entity.

Number of meta models 326 is a collection of domain and meta models that provide a framework for the organization of information. Information is collected and organized by areas of interest, for example, with each area of interest being a domain. Domain models consist of one or more ontologies, in this example, where each domain includes an ontology representing relationships between types of data within that domain. In an illustrative example, one domain may be "geo-location" and have a number of subclasses, including, but not limited to, a subclass for "city", "state" and/or "airport". Each of these subclasses may also have subclasses to further provide semantic value to the available data.

Meta models provide a framework for details about information mapped to domain models. For example, meta models enable the characterization of information providers and consumers using a common unifying syntax for the purposes of monitoring, alerting and tailoring information to match the need to source.

Number of meta models 326 provides the canonical relationship between available information, such as number of resources 310, and the concepts associated with the available information. Number of resources 310 includes structured data 328, semi-structured data 330, and unstructured data 332. Structured data 328 may include, for example, without limitation, relational databases. Semi-structured data 330 may include, for example, without limitation, extensible markup language documents accessible via the world wide web. Unstructured data 332 may include, for example, without limitation, an untagged corpus of data, such as newspaper articles or field reports, for example. Number of resources 310 may be any type of information stored across disparate data sets, or data types, for example. Number of resources 310 may include a traditional, stand alone entity, a composition of resources, and/or any other suitable resource. A stand alone entity may be a table in a relational store, for example. A composition of resources may be joined across tables in disparate, heterogeneous databases or heterogeneous database queries feeding networked services that provide information transformation utilities. Information transformation utilities may be, for example, geocoding/reverse geocoding or information extraction and alignment with other linked data.

Context manager 306 aligns information from number of resources 310 to number of meta models 326 either by directly mapping input from a domain expert or autonomic agent mapping based on semantic relatedness, and uses the mappings to align query 320 to number of resources 310 in response to logical query 324. Context manager 306 provides additional constraints to tailor logical query 324 within a context, and pre-cache and position information anticipated by the context within the network of knowledge management environment 300. Additional constraints may include, for example, without limitation, alignment to a subset of canonical models, dynamic assessment of weighted concept alignment ranking, grounded resource mappings to available concepts in a canonical model, availability of underlying grounded resources, accuracy of the underlying information resources, trust assigned to the underlying resources, update frequency of the underlying resources, information pedigree of the underlying resources, and/or any other suitable constraint. Knowledge manager 302 monitors for results of logical query 324, and may use natural language processor 322 to convert the logical result into a natural language response accessible over user interface 318. User interface 318 also includes data view controller 321 for leveraging results against a number of different views over user interface 318. Data view controller 321 provides extensibility for adding new types of views of the data. This is further described in the section on user interface 410 in FIG. 4.

Context manager 306 includes connection manager 334, mapping manager 336, knowledge extractor 338, and model manager 340. Connection manager 334 monitors the availability of, and need for, number of resources 310 in order to ensure a high availability of information in challenged networks. Connection manager 334 manages and anticipates the information needs of querent 316 using number of agents 342. Number of agents 342 is a distributed society of autonomic agents. Dynamic querent-specific information profiles, generated through a combination of querent-directed requirements, along with dynamic system state information and querent context alignment to satisfiable concepts, provide the input to number of agents 342. Satisfiable concepts refer to canonical model repository concepts aligned to current or anticipated future querent context.

Mapping manager 336 maps information from number of resources 310 to number of meta models 326. Information in number of resources 310 may be mapped to one or more domain ontologies in number of meta models 326. For example, the ontological model "person" may correspond to a list of specific people in number of resources 310 and also to a database field in another dataset with number of resources 310. Mapping manager 336 provides an interface for defining these pairings between classes in number of meta models 326 and classes in number of resources 310. As new data becomes available within number of resources 310, mapping manager 336 confirms whether the structure of one or more associated models within number of meta models 326 still complies with the structure of information within number of resources 310. If a new class of information is available within number of resources 310, both the associated models within number of meta models 326 and the mapping between the associated models and number of resources 310 will be updated by mapping manager 336. The previous version of the ontology and the mapping may be stored to preserve information pedigree and may be retrieved to provide view of information as it existed, prior to new information becoming available. Previous versions of ontologies, or canonical models, are stored in number of concept models 325 of canonical model manager 304. Previous data mappings, such as resources mapped to canonical model concepts, are persisted in context manager 306.

Knowledge extractor 338 manipulates information in number of resources 310 to extract raw text to formulate a response to logical query 324. Knowledge extractor 338 also identifies new information available in number of resources 310 and may build thesauri for use by natural language processor 322 and/or new canonical models for number of concept models 325. Knowledge extractor 338 may process new information detected in number of resources 310 to identify the ontological classes that can be defined from the natural language patterns within unstructured text, or from the internal structure of the data set. Knowledge extractor 338 may also generate a new ontological lower-level model, or subclass, for the new information and align this new lower-level model with an upper-level model, or domain.

Model manager 340 is a contributing component of the context manager, providing monitoring and updates to existing models through a combination of solutions. These solutions may include, for example, without limitation, weighted semantic alignment, context based learning, and/or any other suitable solution. Model manager 340 works in concert with mapping manager 336 to provide access to number of resources 310. Specifically, model manager 340 provides alerts to mapping manager 336 of updates to currently aligned canonical models stored in number of concept models 325. Mapping manager 336 also monitors adjustments associated with resources currently aligned, or mapped, to updated models.

Meta manager 308 bridges semantic and syntactic knowledge model alignment. Meta manager 308 generates result 350 for query 320. Result 350 includes a response to query 320 and information supporting the response. A response may be, for example, "yes," "no," or "there are seven flights leaving Newark today." Information supporting the response may include data used to formulate the response, links to data used to formulate the response, and other information associated with the context of the query and/or response, such as weather information for Newark, for example. Meta manager 308 provides dynamic specifications for existing domain models in number of concept models 325 and number of meta models 326. Meta manager 308 also provides contextually relevant system performance information using context manager 306, and tracks the history of queries submitted to knowledge manager 302 using number of waypoints 344. Number of waypoints 344 is a collection of previous contextual points within a query process, or the current contextual point, for example. A waypoint is a saved snapshot of the whole system at a moment in time. A waypoint may record, for example, without limitation, what data were available, what queries have been run, what responses have been generated, what actions the querent has taken, and any semantic contexts generated by the querent. Active concepts from canonical model manager 304 tracked in meta manager 308 are passed to information queuing manager 312 for monitoring.

Information queuing manager 312 spawns and manages number of agents 314. Number of agents 314 may include number resource monitoring agents 315 and number of positioning agents 317. Number of resource monitoring agents 315 is used by meta manager 308 in tracking contextually relevant resources. Number of resource monitoring agents 315 monitors active information in number of resources 310 mapped to number of concept models 325. Number of positioning agents 317 is used by meta manager 308 to extract and position information within a network, such as knowledge management environment 300. Number of positioning agents 317 may also monitor the location of information in number of resources 310 and the availability relative to that location. The location may be, for example, across a number of nodes. Information may be stored on a number of nodes, and positioned on one node over another node to provide more efficient access based on node characteristics. Node characteristics may include, for example, without limitation, bandwidth, central processing unit power, storage capacity, and/or any other suitable characteristic. Availability of information may be associated with the node characteristics of the number of nodes storing the information, for example.

Knowledge management system 301 leverages instance data aligned to number of meta models 326 to retrieve derived data associated with instance data. For example, the geographic location name "Seattle, Wash." could align to "city" concept, and cities have geographic coordinates which may be expressed in latitude and longitude. Knowledge management system 301 provides information enrichment by providing latitude and longitude coordinates, weather, and any other relevant information associated with the city name, in response to a query containing the city name.

The illustration of knowledge management environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 4:
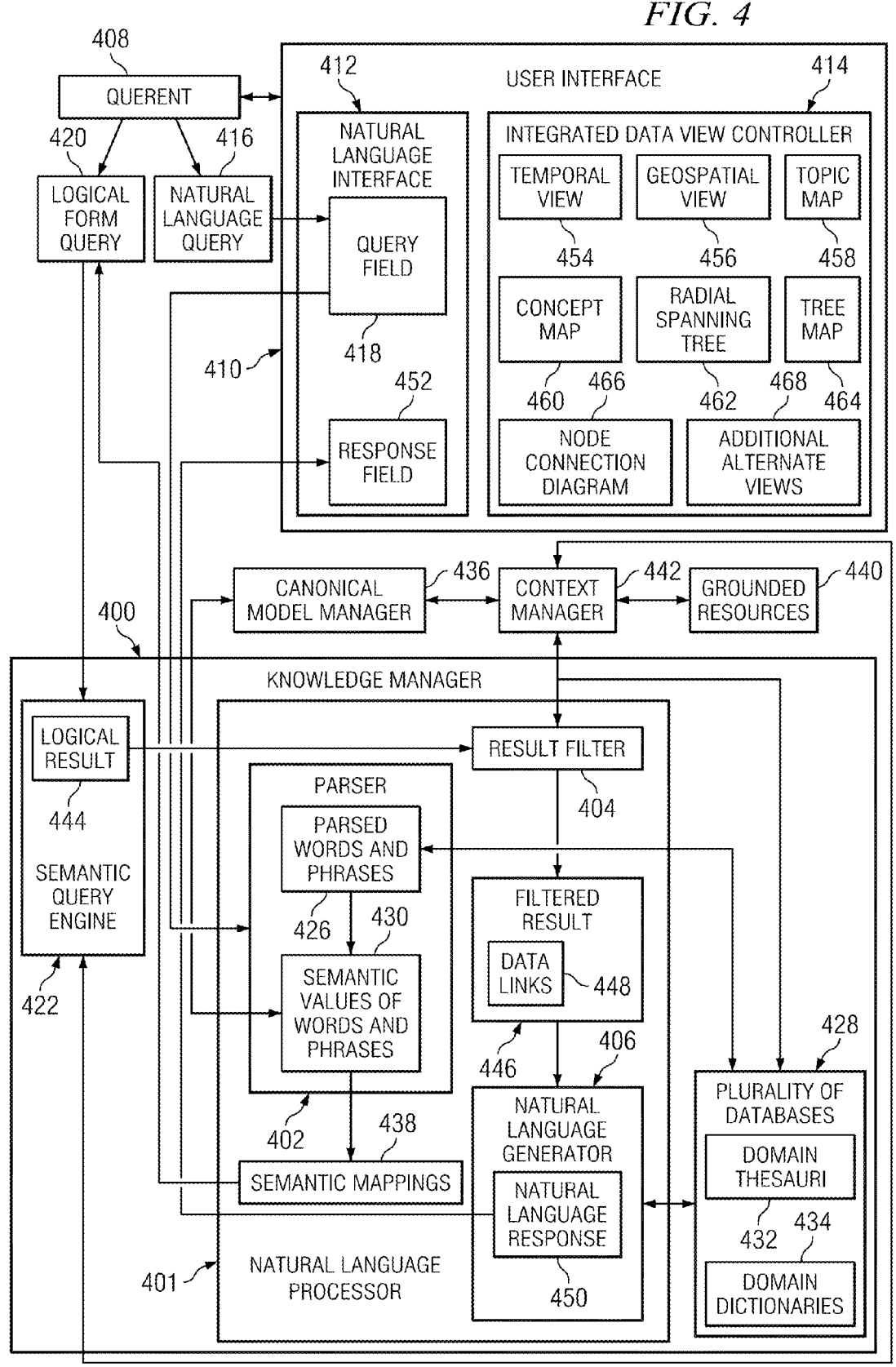
FIG. 4 is an illustration of a knowledge manager in accordance with an advantageous embodiment.

With reference now to FIG. 4, an illustration of a knowledge manager is depicted in accordance with an advantageous embodiment. Knowledge manager 400 is an illustrative example of one implementation of knowledge manager 302 in FIG. 3.

Knowledge manager 400 includes natural language processor 401. Natural language processor 401 is an illustrative example of one implementation of natural language processor 322 in FIG. 3. Natural language processor 401 includes parser 402, result filter 404, and natural language generator 406. Knowledge manager 400 receives queries from querent 408 via user interface 410, and returns results via user interface 410 to querent 408.

User interface 410 is an illustrative example of one implementation of user interface 318 in FIG. 3. User interface 410 includes natural language interface 412 and integrated data view controller 414. In one illustrative example, querent 408 submits natural language query 416 via query field 418 of natural language interface 412. In this example, querent 408 may be a human user. In another illustrative example, querent 408 may submit logical form query 420. In this example, logical form query 420 may be a submission by an autonomous agent submitted directly to knowledge manager 400.

When natural language query 416 is submitted via query field 418, natural language interface 412 routes the query to parser 402 of natural language processor 401. Parser 402 identifies query entities within natural language query 416 by parsing out words and phrases from natural language query 416. Query entities 424 are meaningful objects found in data sources, such as, for example, without limitation, people, locations, physical objects, professional positions or titles, and/or any other suitable data object. Parser 402 parses out a number of words and/or phrases from natural language query 416 to form parsed words and phrases 426. Parser 402 processes parsed words and phrases 426 over plurality of databases 428 to generate semantic values of words and phrases 430.

Queries are expanded according to the possible semantics, as provided by domain thesauri 432 and domain dictionaries 434, and these expansions of the queries are captured in plurality of databases 428. One of these expanded queries is selected by the system based on the ranking of its weighted semantic alignment to the domain model, and hence the mapped grounded resources. This selected query becomes a new focus for the system. The other expansions that were not chosen are retained in plurality of databases 428 as possible lines of further inquiry. At this point in time, as well as others, and also as prescribed by querent 408, a waypoint is recorded by a meta manager, such as meta manager 308 in FIG. 3. Plurality of databases 428 is a collection of databases distributed across the network system as determined by context manager 442. These databases may include domain thesauri 432 and domain dictionaries 434. Domain thesauri 432 and domain dictionaries 434 are domain-specific information resources. These sources are intrinsically bound to domain models and are aligned to querent 408 through context manager 442. Semantic values of words and phrases 430 provide the framework for the relationship between parsed words and phrases 426 of natural language query 416.

Parser 402 then processes semantic values of words and phrases 430 over canonical model manager 436 to generate semantic mappings 438. Semantic mappings 438 bind information from grounded resources 440 to domain models within canonical model manager 436 using domain thesauri 432 and domain dictionaries 434. Grounded resources 440 may be an illustrative example of one implementation of number of resources 310 in FIG. 3.

Knowledge manager 400 uses semantic mappings 438 to convert natural language query 416 into logical form, resulting in logical form query 420, in one illustrative example. Logical form query 420 is then passed to semantic query engine 422. Semantic query engine 422 is a web service which processes each query over information in grounded resources 440, using context manager 442 to return logical result 444. Logical result 444 is routed to result filter 404 of knowledge manager 400. Result filter 404 uses context manager 442 to sort information in logical result 444 according to the context of the query from querent 408, and generate filtered result 446.

Filtered result 446 presents results for a logical form query in order of relevance, and includes data links 448. Data links 448 may be used to expand result information, for example, by linking to additional resources used to generate result information in filtered result 446. Filtered result 446 may be returned directly to querent 408 in the illustrative example of logical form query 420 submitted by querent 408. If a natural language result is desired, in the illustrative example of querent 408 submitting natural language query 416, filtered result 446 is processed by natural language generator 406.

Natural language generator 406 translates filtered result 446 into natural language response 450. Natural language response 450 is then presented in response field 452 of natural language interface 412 via user interface 410. Natural language response 450 may include data links 448 from filtered result 446, as well as result information in order of relevance, in a natural language form.

User interface 410 provides querent 408 access to integrated data view controller 414. Integrated data view controller 414 may integrate any number of different views to display result data for queries, such as filtered result 446 and/or natural language response 450, for example. Integrated data view controller 414 may include temporal view 454, geospatial view 456, topic map 458, concept map 460, radial spanning tree 462, tree map 464, node connection diagram 466 and/or any other suitable view, as represented by additional alternate views 468. Temporal view 454 may provide a graphical view and navigation of results along a timeline, for example. Geospatial view 456 may provide a graphical view and navigation of results in relation to geographical locations, for example. Topic map 458 may provide a structural view and navigation of concepts in a number of models contained in canonical model manager 436, such as number of canonical models 325 and/or number of semantic models 326 in FIG. 3, for example. Topic map 458 provides for highlighting any instance data associated with selected concepts for viewing and navigation. Concept map 460 may provide a graphical view and navigation of the context of natural language query 416 or logical form query 420, for example. Concept map 460 may include visual cues, including but not limited to, color coding and symbolic representation. Concept map 460 provides immediately identifiable indicators of instance data from grounded resources 440 mapped to contextually aligned canonical models within the purview of querent 408. After a query, either in logical form or natural language form, has been processed, and a response has been returned, there can been continuous interaction between querent 408 and any element of user interface 410 to further explore the information returned.

The illustration of knowledge manager 400 in FIG. 4 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 5:
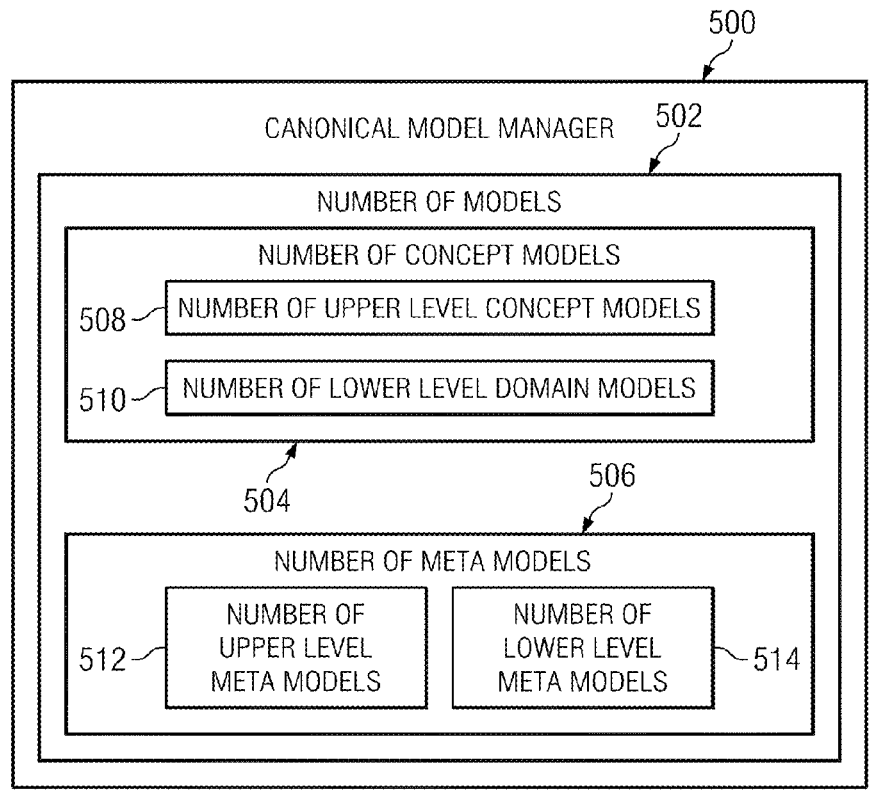
FIG. 5 is an illustration of a canonical model manager in accordance with an advantageous embodiment.

With reference now to FIG. 5, an illustration of a canonical model manager is depicted in accordance with an advantageous embodiment. Canonical model manager 500 is an illustrative example of one implementation of canonical model manager 304 in FIG. 3. Canonical model manager 500 includes number of models 502. Number of models 502 may include, for example, without limitation, number of concept models 504, number of meta models 506, and/or any other suitable models. Number of concept models 504 represents models of concepts within categories, or areas of interest, for example. Number of concept models 504 includes number of upper level concept models 508 and number of lower level domain models 510. Number of upper level concept models 508 represents a class associated with a domain, while number of lower level domain models 510 represents subclasses associated with number of upper level concept models 508. In an illustrative example, an upper level concept model may be a general class of "location". A lower level domain model, or subclasses, associated with "location" may include members of the class, such as "coordinate" with property "units." One lower level model may express these coordinates in Universal Transverse Mercator (UTM), while another may express them as Military Grid Reference System (an extension of UTM), while yet a third may express coordinates in Latitude, Longitude in decimal degrees, in this illustrative example. The upper level concept model provides the unifying definition across these domain specific lower level domain models, enabling translation between MGRS and Latitude Longitude coordinate systems, for example.

Number of upper level concept models 508 acts as a bridge, creating a logical relationship between two or more lower level models of number of lower level domain models 510. In designing an upper level concept model for a given domain, an existing lower level domain ontology may be identified for a part of that domain. Incorporating the existing domain ontology as a lower level model, and creating one or more additional lower level models to cover the remainder of the domain, may reduce time and effort in constructing models for number of models 502.

Number of meta models 506 may include number of upper level meta models 512 and number of lower level meta models 514. Meta models provide information about the modeled information. These may include, but are not limited to, information producer characterizations, information consumer characterizations, information quality characterizations, security models and preference models, for example. Characterization of information endpoints, such as producer and consumer, through conceptualizations, such as quality, security, and preference, enable knowledge management system 301 in FIG. 3 to improve alignment of contextually relevant information and tailor resource requirements to need. For example, if required location accuracy is higher than a selected resource, either individually or as a composition of multiple resources, the lower fidelity resource would be excluded until meta manager 308 determined the resource was necessary. Meta manager 308 may determine a resource is necessary due to a circumstance such as, for example, without limitation, emergent composition requiring the resource, no other information available, change in meta model, and/or any other circumstance.

The illustration of canonical model manager 500 in FIG. 5 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 6:
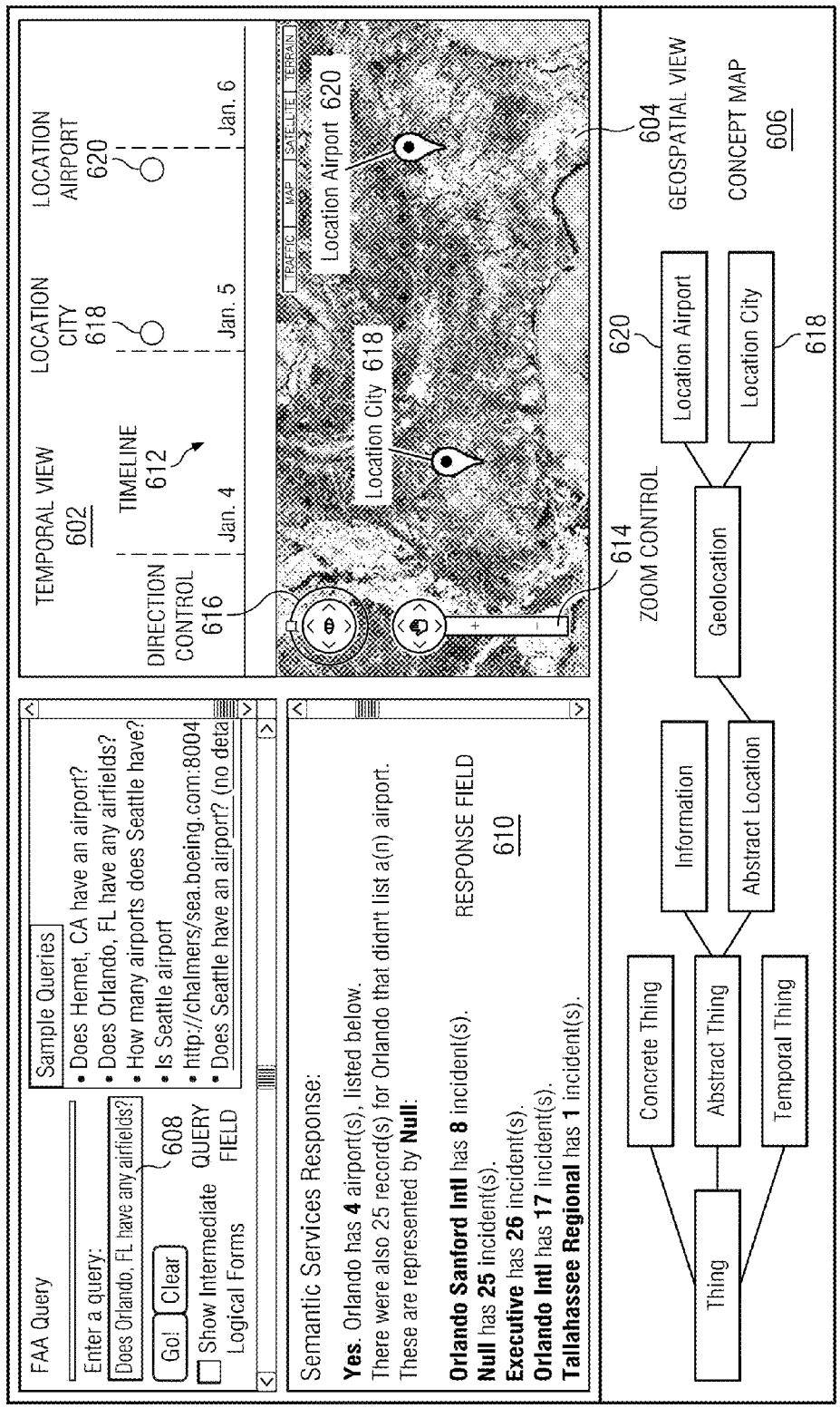
FIG. 6 is an illustration of an integrated view in accordance with an advantageous embodiment.

With reference now to FIG. 6, an illustration of an integrated view is depicted in accordance with an advantageous embodiment. Integrated view 600 is an illustrative example of one implementation of an integrated view provided through user interface 410 using integrated data view controller 414 in FIG. 4.

Integrated view 600 includes temporal view 602, geospatial view 604, concept map 606, query field 608, and response field 610. Temporal view 602 includes timeline 612. A querent, such as querent 408 in FIG. 4, may navigate integrated view 600 to filter information to a specific window of time along timeline 612, for example. In this illustrative example, the filtered information in the results displays a period of time with markers for LocationCity 618 and LocationAirport 620.

Geospatial view 604 is integrated with temporal view 602 to display LocationCity 618 and LocationAirport 620 with associated geographic location information, such as a map view, in this example. Geospatial view 604 includes zoom control 614 and direction control 616 to allow for navigation to filter information according to geographic location, in this example. In an illustrative example, zoom control 614 may be manipulated to provide a different range of geospatial information, which changes the focus of temporal view 602 accordingly. In this example, if zoom control 614 is manipulated to zoom in on geospatial view 604 and isolate LocationCity 618 within geospatial view 604, temporal view 602 would accordingly narrow the focus of timeline 612 to the time period containing the marker for LocationCity 618. Because the underlying information is linked between temporal view 602 and geospatial view 604, navigating integrated view 600 provides updates to each view, in addition to concept map 606. Concept map 606 cues the querent to the subset of information available by concept within the provided additional constraints, in this example, temporal and geographic location. Natural language response and data links with result information may be displayed in response field 610.

The illustration of integrated view 600 in FIG. 6 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, any number of different views may be integrated in addition to geospatial view 604 and temporal view 602. In another illustrative example, a single graphical view may be integrated with filtered language result 440 in FIG. 4.

Figure 7:
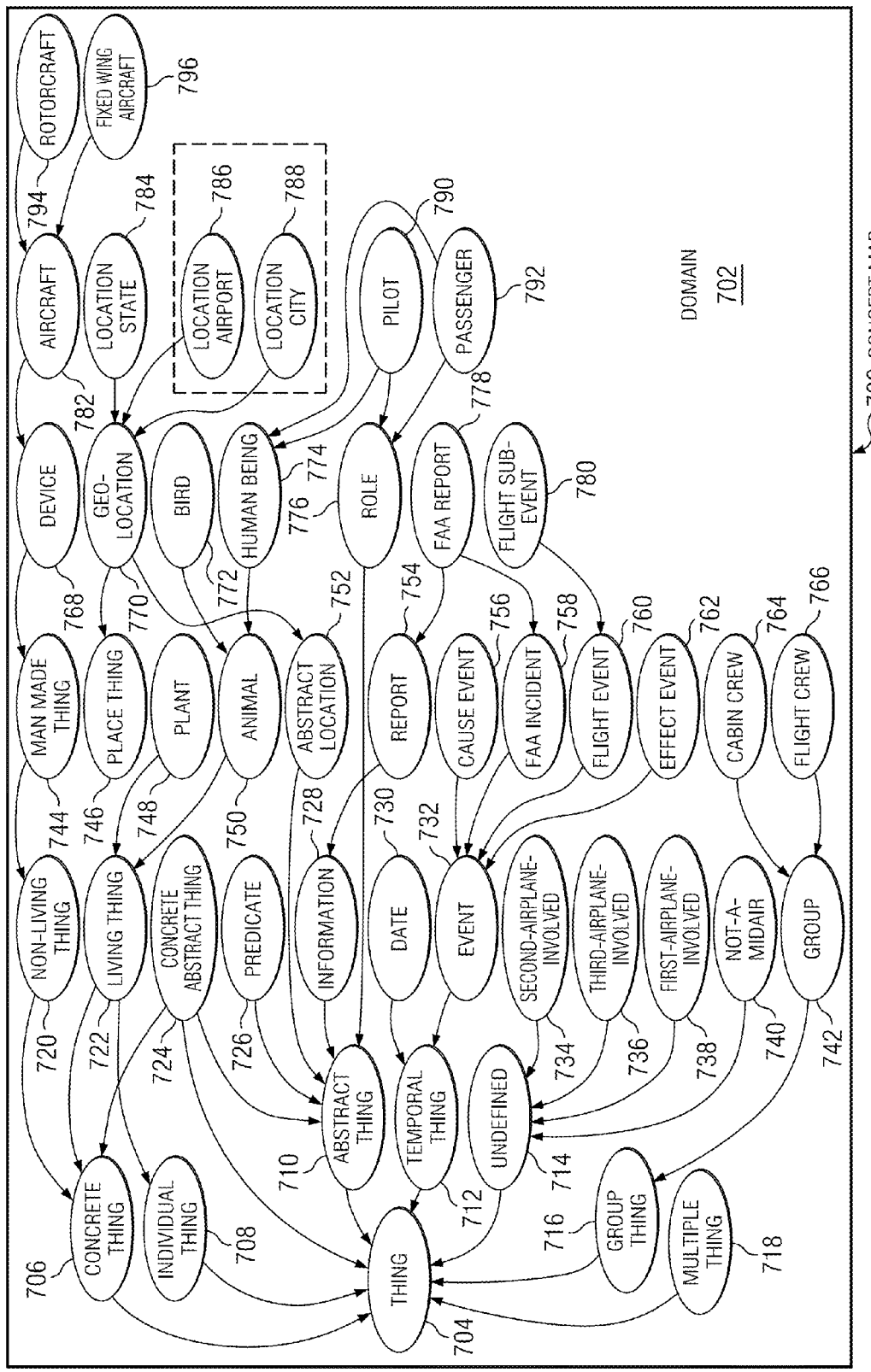
FIG. 7 is an illustration of a concept map in accordance with an advantageous embodiment.

With reference now to FIG. 7, an illustration of a concept map is depicted in accordance with an advantageous embodiment. Concept map 700 is an illustrative example of one implementation of concept map 452 in FIG. 4.

Concept map 700 is a graphical representation of domain 702. Domain 702 includes thing 704. Thing 704 is the concept that defines domain 702, for example. Thing 704 may be linked to concrete thing 706, individual thing 708, abstract thing 710, temporal thing 712, undefined 714, group thing 716, and multiple thing 718.

Non-living thing 720 links to concrete thing 706. Living thing 722 links to concrete thing 706 as well as individual thing 708. Concrete abstract thing 724 may directly link to thing 704 as well as concrete thing 706 and abstract thing 710. Predicate 726 and information 728 link to abstract thing 710. Date 730 and event 732 link to temporal thing 712. Second_Airplane_Involved 734, Third_Airplane_Involved 736, First_Airplane_Involved 738, and NOT_A_MIDAIR 740 each link to undefined 714. Group 742 links to group thing 716.

Man made thing 744 links to non-living thing 720. Plant 748 and animal 750 link to living thing 722. Abstract location 752 links directly to abstract thing 710. Report 754 links to information 728. Cause event 756, FAA incident 758, flight event 760, and effect event 762 each link to event 732. Cabin crew 764 and flight crew 766 each link to group 742.

Device 768 links to man made thing 744. Geo-location 770 links to both place thing 746 and abstract location 752. Bird 772 and human being 774 each link to animal 750. Role 776 links directly to abstract thing 710. FAA report 778 links to both report 754 and FAA incident 758. Flight sub-event 780 links to flight event 760.

Aircraft 782 links to device 768. LocationState 784, LocationAirport 786, and LocationCity 788 each link to geo-location 770. Pilot 790 and passenger 792 each link to human being 774. Rotorcraft 794 and fixed wing aircraft 796 each link to aircraft 782.

Concept map 700 represents a context of a query stream built over successive natural language queries from a querent, such as querent 316 in FIG. 3. The provided hierarchical view of aligned canonical domain model relationships is augmented with visual cues to both the concepts within the model currently mapped to grounded resources and concepts associated with existing, previous waypoint data. Based on availability of instance data associated with the concept airports, a querent may initially submit a natural language query for "airport locations in Washington, D.C.", which maps to domain 702. Query results, cached in the plurality of databases 428 in FIG. 4, as a waypoint, would be visually indicated within the concept map.

The illustration of concept map 700 in FIG. 7 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 8:
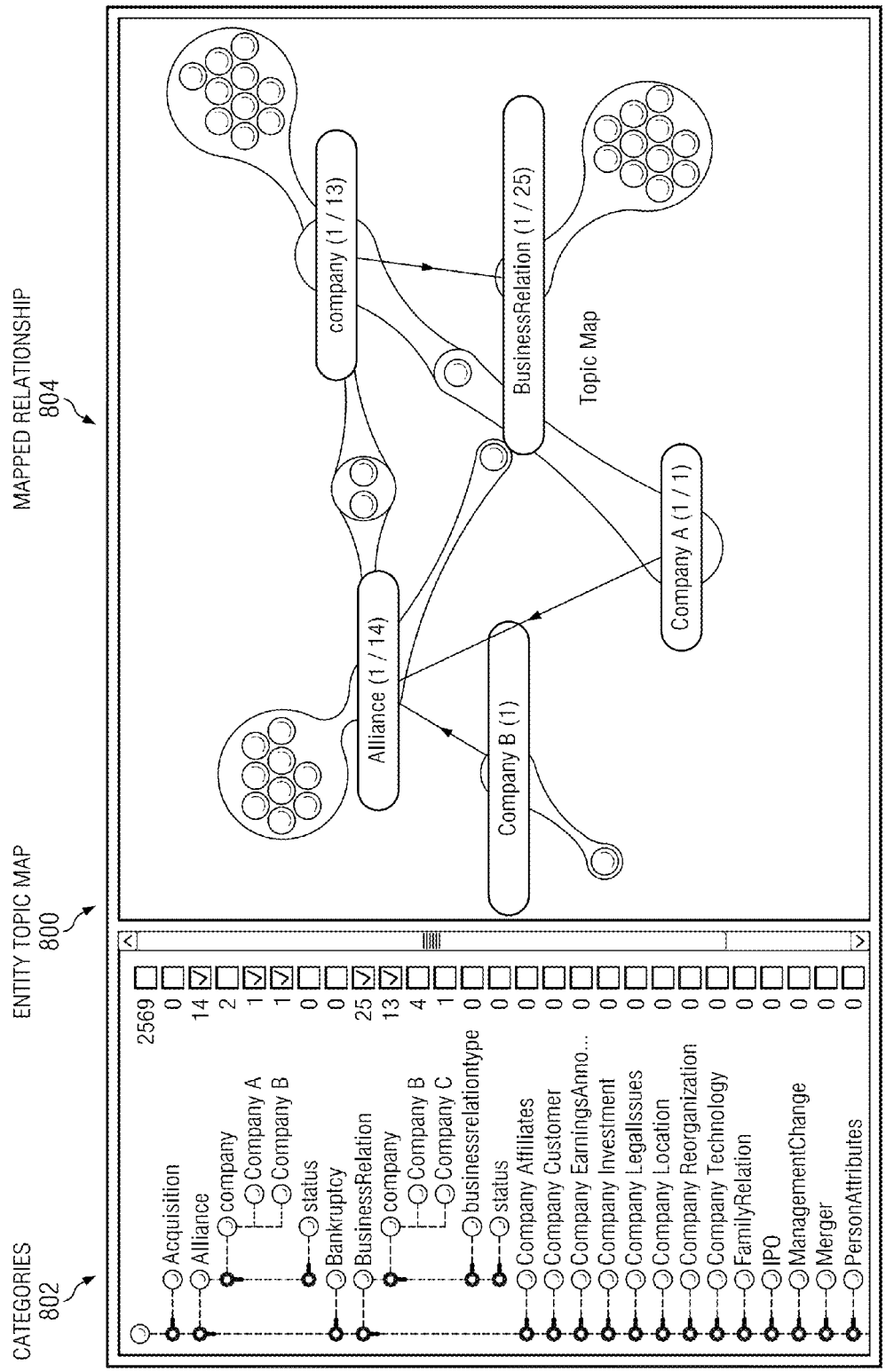
FIG. 8 is an illustration of an entity topic map in accordance with an advantageous embodiment.

With reference now to FIG. 8, an illustration of an entity topic map is depicted in accordance with an advantageous embodiment. Topic map 800 is an illustrative example of one implementation of topic map 458 in FIG. 4.

Topic map 800 includes categories 802 and mapped relationship 804. Topic maps contain retrieved instance data targeted to the querent over successive waypoints. Instance data relationships accumulated over successive queries are depicted, allowing for rapid visual ingestion of direct domain model concept associations. Mapped relationship 804 is a graphic depiction of relationships between categories 802 selected by a querent or in response to a query, for example.

The illustration of topic map 800 in FIG. 8 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 9:
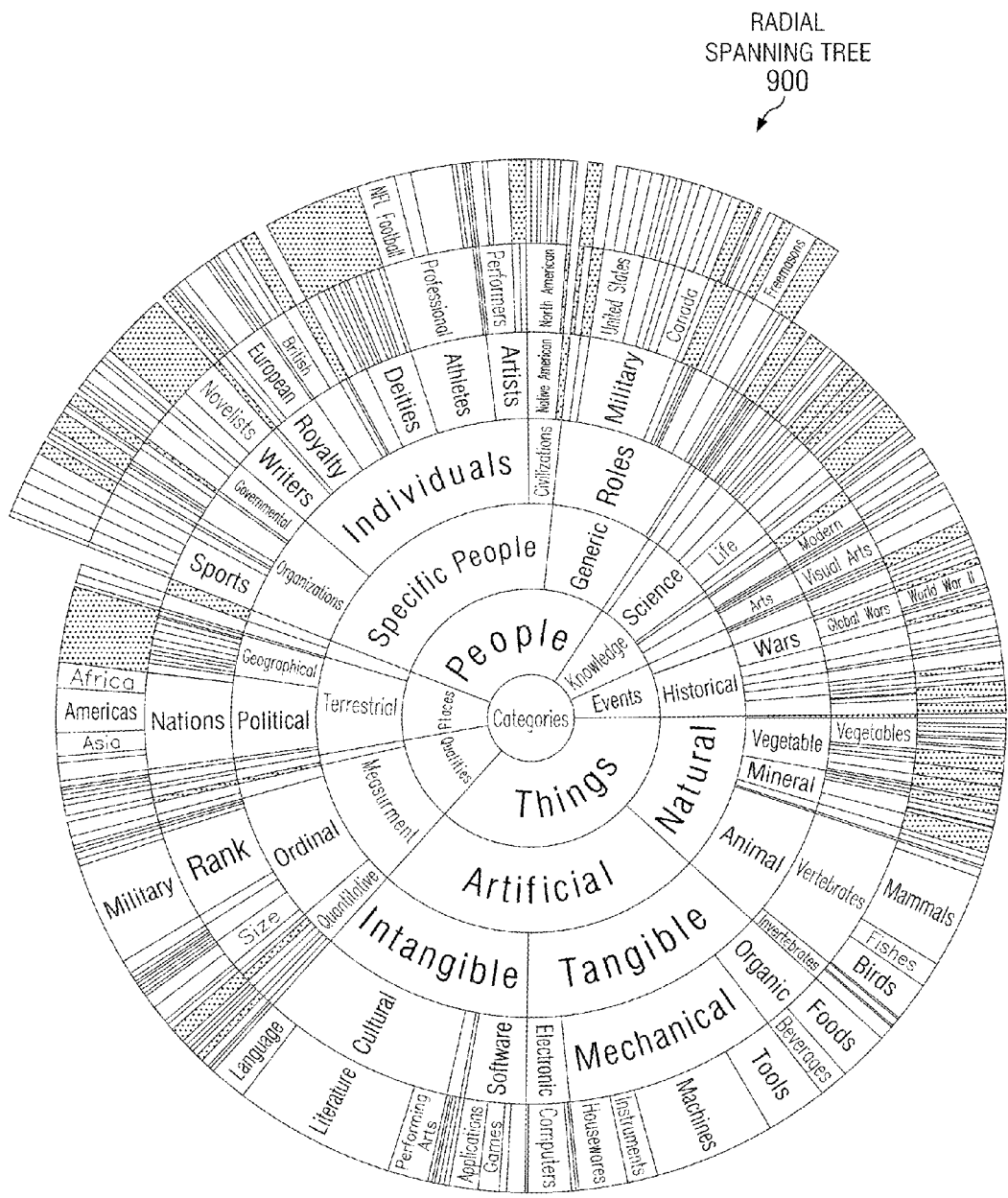
FIG. 9 is an illustration of a radial spanning tree in accordance with an advantageous embodiment.

With reference now to FIG. 9, an illustration of a radial spanning tree is depicted in accordance with an advantageous embodiment. Radial spanning tree 900 is an illustrative example of one implementation of radial spanning tree 462 in FIG. 4. Radial spanning tree 900 is a graphical depiction of search concept instances shared within a querent community. A querent community is a logical grouping of querents within a common community of interest associated with a canonical domain representation. Radial spanning tree 900 provides a means to provide a pivot search of waypoints between querents within in a community regardless of the original querent submission, based on the unifying terminology of the canonical domain model. In this illustrative example, radial spanning tree 900 displays information by concept, with weighted radial sectors sized by the underlying content and dynamically rebuilt and centered on a querent-designated primary topic. Sector size is directly proportional to the quantity of concept Query results. The primary topic becomes the central topic in this illustrative example.

The illustration of radial spanning tree 900 in FIG. 9 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 10:
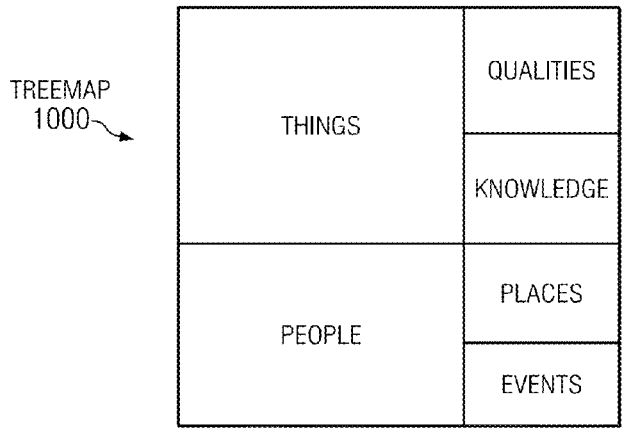
FIG. 10 is an illustration of a treemap in accordance with an advantageous embodiment.

With reference now to FIG. 10, an illustration of a treemap is depicted in accordance with an advantageous embodiment. Treemap 1000 is an illustrative example of one implementation of treemap 464 in FIG. 4. Treemap 1000 is a visual representation grouping concept hierarchies of waypoint data by parent and child categories within nested rectangles. Child concepts are represented as smaller rectangles within the parent. In some illustrative examples, rectangle color may be used to cue information availability and relevancy of underlying information. Availability is based on grounded resource mappings to concepts and agent-based monitoring of said resources. Relevancy is determined based on weighted semantic alignment of the concept, domain and meta models. Meta model instance data is computing dynamically by resource monitoring agents spawned by an information queuing manager, such as number of resource monitoring agents 315 spawned by information queuing manager 312 in FIG. 3. Rectangle size within treemap 1000 is proportional to the instance data associated with the concept displayed. Treemap 1000 displays information organized by category, provides a compact view of conceptual and instance data, and can improve recognition of patterns in underlying data.

The illustration of treemap 1000 in FIG. 10 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 11:
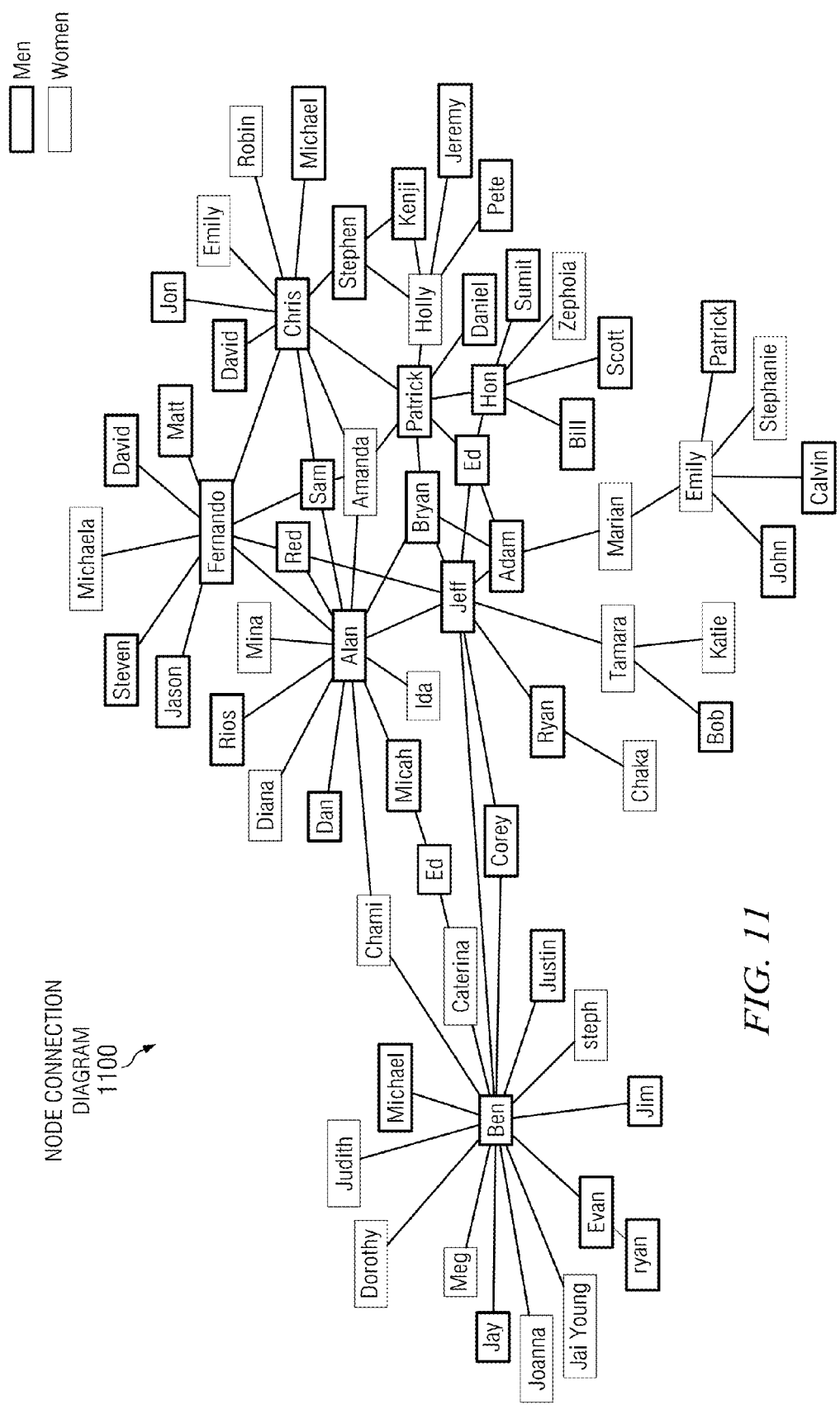
FIG. 11 is an illustration of a node connection diagram in accordance with an advantageous embodiment.

With reference now to FIG. 11, an illustration of a node connection diagram is depicted in accordance with an advantageous embodiment. Node connection diagram 1100 is an illustrative example of node connection diagram 466 in FIG. 4.

Node connection diagram 1100 is a graphical depiction of instance data relationships bound by conceptual relations. Node connection diagram 1100 depicts entity interrelationships. Entities may be, for example, without limitation, people, locations, physical objects, professional positions or titles, and/or any other suitable entity. In an illustrative example, node connection diagram 1100 may be used to depict the interrelationships of instance entities, where the number of lines interconnecting any one node with another provides a visual depiction of a node's relationships with other entity nodes.

The illustration of node connection diagram 1100 in FIG. 11 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 12A:
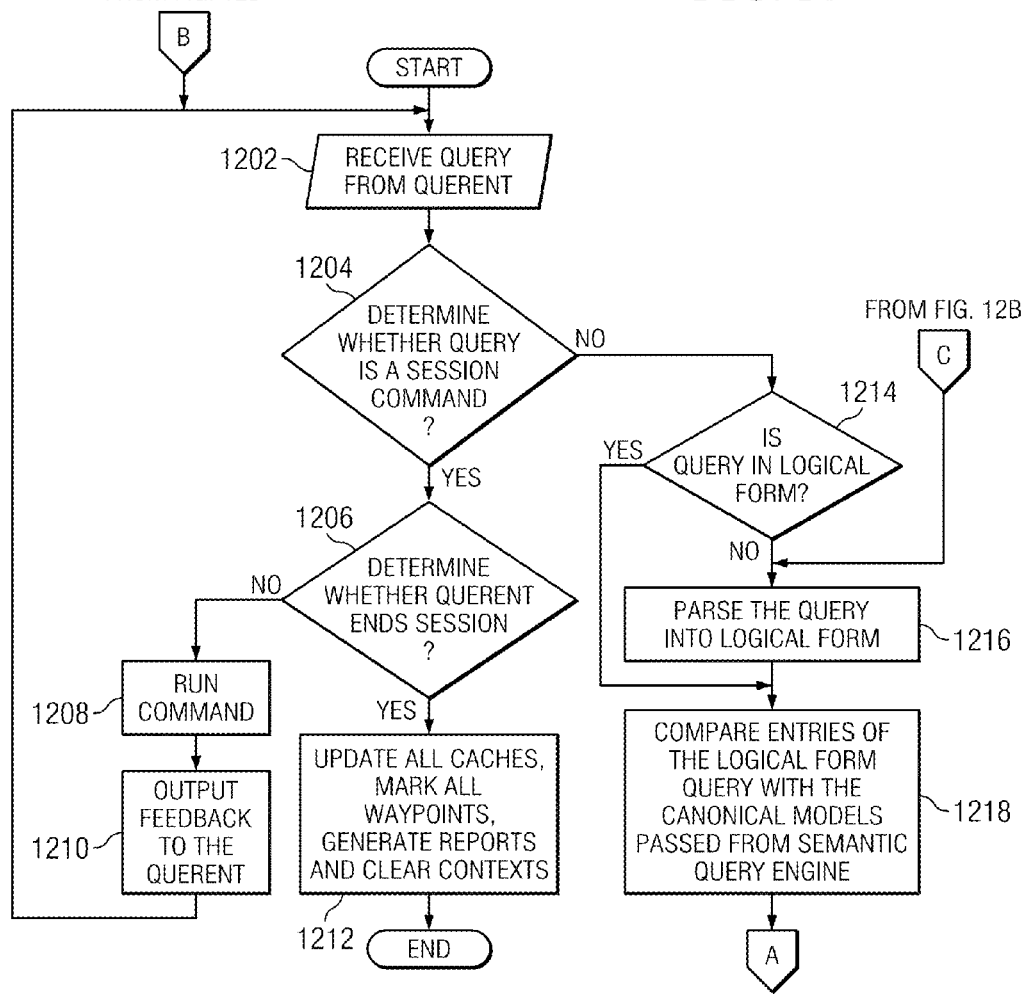
FIGS. 12A and 12B are an illustration of a flowchart for knowledge discovery in accordance with an advantageous embodiment.
Figure 12B:
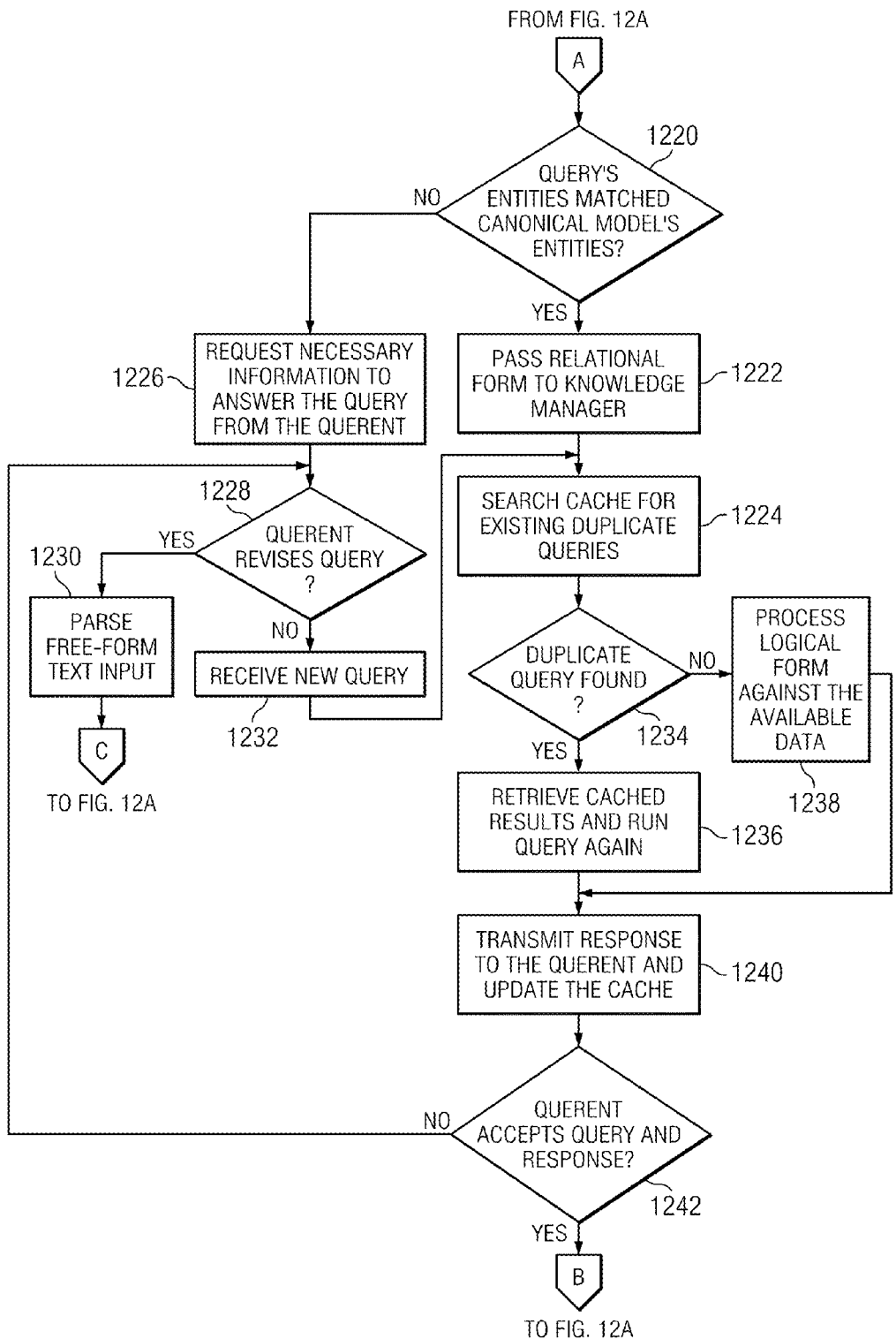

With reference now to FIGS. 12A and 12B, an illustration of a flowchart for knowledge discovery is depicted in accordance with an advantageous embodiment. The process in FIG. 12 may be implemented by knowledge management system 301 in FIG. 3, for example.

The process begins by receiving a query from a querent (operation 1202). The process first determines whether the query received is a session command (operation 1204). A session command may be, for example, without limitation, save, open, new, explain, more, all, and/or any other suitable command. "Save" prompts a user, or querent, for a session path and name before saving the current dialogue to storage for later access. "Open" prompts the querent for a session path and name before opening the dialogue from storage. "New" aborts the current session and begins a new session. "Explain" explains the logic and traces the data pedigree for the most recent query. "More" shows more results. "All" shows all results.

If a determination is made that the query is a session command, the process then determines whether the querent ends the session (operation 1206). If a determination is made that the querent is not ending the session, the process runs the command (operation 1208) and outputs feedback to the querent (operation 1210), with the process returning to operation 1202.

If a determination is made that the querent is ending the session, the process updates all caches, marks all waypoints, generates reports, and clears contexts (operation 1212), with the process terminating thereafter.

If a determination is made at operation 1204 that the query is not a session command, the process then determines whether the query is in logical form (operation 1214). If a determination is made that the query is not in logical form, the process parses the query into logical form (operation 1216). The process may parse the query into logical form using a parser, such as parser 402 in FIG. 4, for example. The process then compares entities of the logical form query with the canonical models passed from a semantic query engine (operation 1218). If a determination is made in operation 1214 that the query is in logical form, the process proceeds directly to operation 1218.

The process then determines whether the query's entities matched canonical model's entities (operation 1220). If a determination is made that the query's entities matched canonical model's entities, the process passes the relational form to the knowledge manager (operation 1222). The process then searches the cache for existing duplicate queries (operation 1224).

If a determination is made that the query's entities did not match canonical model's entities, the process requests necessary information to answer the query from the querent (operation 1226). The process then determines whether the querent revises the query (operation 1228).

If a determination is made that the querent revises the query, the process parses the free-form text input (operation 1230) and returns to operation 1216. If a determination is made that the querent did not revise the query, the process receives a new query (operation 1232) and proceeds to operation 1224.

Next, the process determines whether a duplicate query is found (operation 1234). If a duplicate query is found, the process retrieves cached results and runs the query again (operation 1236). The query may be run against available data and the new result compared with the cached result. If the fresh results do not match the cached results, the querent of the original query is notified that relevant data has been updated.

If no duplicate query is found, the process processes the logical form against the available data (operation 1238). The process then transmits a response to the querent and updates the cache (operation 1240). The process may transmit the response via a user interface, such as user interface 318 in FIG. 3, or directly to a querent system, in some examples. The process then determines whether the querent accepts the query and response (operation 1242). If a determination is made that the querent does not accept the query and response, the process returns to operation 1228. If a determination is made that the querent accepts the query and result, the process returns to operation 1202.

The knowledge management system is always open to new queries, and waypoints persist from session to session, enabling a querent to pick up again at any number of points. Additionally, if new resources become available that align to a previous query, the system may alert the querent of updated data.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product, accessible from a computer-usable or computer-readable medium, providing program code for use by or in connection with a computer or any device or system that executes instructions. For the purposes of this disclosure, a computer-usable or computer-readable medium can generally be any tangible apparatus that can contain, store, communicate, propagate, or transport the program for use by or in connection with the instruction execution system, apparatus, or device.

The computer-usable or computer-readable medium can be, for example, without limitation an electronic, magnetic, optical, electromagnetic, infrared, or semiconductor system, or a propagation medium. Non-limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer-readable or usable program code, such that when the computer-readable or usable program code is executed on a computer, the execution of this computer-readable or usable program code causes the computer to transmit another computer-readable or usable program code over a communications link. This communications link may use a medium that is, for example without limitation, physical or wireless.

A data processing system suitable for storing and/or executing computer-readable or computer-usable program code will include one or more processors coupled directly or indirectly to memory elements through a communications fabric, such as a system bus. The memory elements may include local memory employed during actual execution of the program code, bulk storage, and cache memories, which provide temporary storage of at least some computer-readable or computer-usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems, or remote printers, or storage devices through intervening private or public networks. Non-limiting examples of modems and network adapters are just a few of the currently available types of communications adapters.

The different advantageous embodiments recognize and take into account a number of different considerations. For example, the different advantageous embodiments recognize and take into account that current systems for retrieving information stored across disparate data sets can be very inefficient. Querying across whole collections of data requires querying each disparate resource individually. Additionally, each resource may have a unique query language or style required to access information. Summarizing the results of these individual searches is costly in terms of time and effort, and the information collected may be ambiguous.

The different advantageous embodiments further recognize and take into account that current methods for summarizing information collected include manual research and compilation by human users. Other methods involve use of expensive tools that are not configured to meet specific user needs, and/or require learning a specialized query language. Individual query results at best provide a result to the asked question, often missing the implied query or context. Additionally, data of various types are best represented in particular formats. For example, geospatial data is most clearly represented on a geographic map, while temporal data is best represented on a timeline. Query results are often made up of more than one type of data, which further increases the amount of information returned.

Thus, one or more of the different advantageous embodiments provide a system that uses queries to select and filter information, tailoring the resulting view of information to pertain to a current task. The information that is to be accessed and used to formulate a response is pre-positioned in anticipation of a request using a context built by one or more user queries and system knowledge represented in the meta models. Various types of data that make up a query result are represented in an integrated view incorporating geographic maps, timelines, concept maps and lists, for example. This transformative, context-sensitive solution relieves information overload.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system for positioning data within a network, the system comprising:
    a processor configured to execute a knowledge manager configured to receive a query from a querent, the knowledge manager further configured to:
        receive the query from the querent, and determine whether the query is in logical form, and responsive to a determination that the query is in logical form, compare entries of the logical form query with canonical models passed from a semantic query engine, and determine whether the entries of the logical form query match entries of the canonical models, and responsive to a determination that the entries of the logical form query match the entries of the canonical models, pass a relational form query to the knowledge manager;
        determine whether the query is a session command, and responsive to a determination that the query is a session command, determine whether the querent ends a session, and responsive to a determination that the querent ends the session, the knowledge manager updates all caches, marks all waypoints, generates reports, and clears contexts; and
        process the query across a number of resources to generate a result;
    the processor further configured to execute a canonical model manager having a number of models used to identify relationships between types of information within the number of resources and the query; and
    the processor further configured to execute a context manager configured to manage the context of the query and the relationships identified by the canonical model manager, to position the number of resources for access by the knowledge manager.

2. The system of claim 1, wherein the query is at least one of a natural language query and a logical form query.

3. The system of claim 2, wherein the knowledge manager is further configured to convert the natural language query into logical form.

4. The system of claim 1, further comprising:
    an information queuing manager, executed by the processor, configured to spawn a number of agents to monitor the number of resources and position information within the number of resources.

5. The system of claim 4, wherein the number of agents further comprises:
    a first number of resource monitoring agents configured to track contextually relevant information within the number of resources; and
    a second number of positioning agents configured to extract and position information within the network.

6. The system of claim 1, wherein the knowledge manager further comprises:
    a natural language interface configured to parse the natural language query to identify a number of words and a number of phrases, wherein the natural language interface uses the number of words and the number of phrases to map the natural language query to a number of domain models.

7. The system of claim 1, wherein the knowledge manager further comprises:
    an image data view controller configured to integrate the result with a number of views for display over a user interface.

8. The system of claim 7, wherein the image data view controller further includes providing the querent access to at least one of a temporal view, geospatial view, topic map, concept map, radial spanning tree, tree map, and a node connection diagram over the user interface.

9. The system of claim 1, wherein the knowledge manager is configured to process the query across the number of resources to generate the result, and wherein the result is a first result, the system further comprising:
    a result filter generating a filtered result from the first result, wherein the result filter uses the context manager to sort information in logical result according to the context of the query from the querent, and generates the filtered result.

10. A method for positioning data within a network, the method comprising:
    receiving a query from a querent, wherein the query is a natural language query from the querent received over a user interface;
    determining, on a processor, whether the query is a session command;
    responsive to a determination that the query is a session command, determining whether the querent ends a session;
    responsive to a determination that the querent ends the session, updating all caches, marking all waypoints, generating reports, and clearing contexts;
    responsive to a determination that the query is not a session command, determining, using a processor, whether the query is in logical form;

responsive to a determination that the query is in logical form, comparing entries of the logical form query with canonical models passed from a semantic query engine;

determining, using the processor, whether the entries of the logical form query match entries of the canonical models;

responsive to a determination that the entries of the logical form query match the entries of the canonical models, passing a relational form query to a knowledge manager;

responsive to a determination that the query is not a session command, parsing, on the processor, the natural language query to identify a number of words and a number of phrases;

mapping, on the processor, the natural language query to a number of domain models using the number of words and the number of phrases;

converting, on the processor, the natural language query into a logical query using the number of domain models mapped to the natural language query;

identifying, on the processor, relationships between types of information within a number of resources and the natural language query; and processing the logical query across the number of resources to generate a result, the result returnable to the querent via the user interface providing the querent access to an integrated data view controller.

11. The method of claim 10 further comprising:
tracking a history of natural language queries using a number of waypoints, wherein the number of waypoints provides a context path for the history of natural language queries.

12. The method of claim 10 further comprising:
monitoring availability of information within the number of resources.

13. The method of claim 10, wherein providing the querent access to the integrated data view controller further includes providing the querent access to at least one of a temporal view, geospatial view, topic map, concept map, radial spanning tree, tree map, and a node connection diagram.

14. The method of claim 10 further comprising:
searching the cache for existing duplicate queries; and
responsive to finding a duplicate query, retrieving cached results and running the query again.

15. A method for knowledge management, the method comprising:
receiving a query from a querent;
determining, on a processor, whether the query is a session command;
responsive to a determination that the query is a session command, determining whether the querent ends a session;
responsive to a determination that the querent ends the session, updating all caches, marking all waypoints, generating reports, and clearing contexts;
responsive to a determination that the query is not a session command, determining, using the processor, whether the query is in logical form;
responsive to a determination that the query is in logical form, comparing entries of the logical form query with canonical models passed from a semantic query engine;
determining, using the processor, whether the entries of the logical form query match entries of the canonical models; and
responsive to a determination that the entries of the logical form query match the entries of the canonical models, passing a relational form query to a knowledge manager.

16. The method of claim 15 further comprising:
responsive to a determination that the query is not in logical form, parsing the query into logical form before comparing entries of the logical form query with the entries of the canonical models passed from the semantic query engine.

17. The method of claim 15 further comprising:
responsive to a determination that the entries do not match, requesting necessary information to answer the query from the querent;
determining whether the querent revises the query;
responsive to a determination that the querent revises the query, parsing free-form text input; and
parsing the free-form text input into logical form.

18. The method of claim 15 further comprising:
searching the cache for existing duplicate queries; and
responsive to finding no duplicate query, processing the logical form query against available data in a number of resources.

19. The method of claim 15 further comprising:
transmitting a response of the query to the querent and updating the cache.

* * * * *